United States Patent
daCosta

(10) Patent No.: US 8,059,152 B2
(45) Date of Patent: Nov. 15, 2011

(54) VIDEO DETECTION AND ENHANCEMENT OF A SPORT OBJECT

(75) Inventor: Behram daCosta, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 790 days.

(21) Appl. No.: 12/174,189

(22) Filed: Jul. 16, 2008

(65) Prior Publication Data

US 2010/0013932 A1    Jan. 21, 2010

(51) Int. Cl.
*H04N 7/18* (2006.01)
(52) U.S. Cl. .................. 348/157; 348/156; 348/169
(58) Field of Classification Search ........... 348/143–169
See application file for complete search history.

(56) References Cited

U.S. PATENT DOCUMENTS

| | | | |
|---|---|---|---|
| 3,840,699 A | | 10/1974 | Bowerman |
| 4,064,528 A | * | 12/1977 | Bowerman ................. 348/578 |
| 5,912,700 A | * | 6/1999 | Honey et al. ............... 348/157 |
| 5,923,365 A | * | 7/1999 | Tamir et al. ................ 348/169 |
| 6,154,250 A | * | 11/2000 | Honey et al. ............... 348/157 |
| 6,252,632 B1 | * | 6/2001 | Cavallaro ................... 348/585 |
| 7,154,540 B2 | * | 12/2006 | Honey et al. ............. 348/222.1 |
| 2005/0018045 A1 | | 1/2005 | Alexander et al. |

FOREIGN PATENT DOCUMENTS

| GB | 2341997 A | 3/2000 |
|---|---|---|
| WO | WO0010129 A1 | 2/2000 |

OTHER PUBLICATIONS

Rees et al., Click-It: interactive television highlighter for sports action replay, Proceedings, 14th International Conference on Pattern Recognition, vol. 2, p. 1484-1487, Aug. 16-20, 1998.
Rafey et al.; "Enabling Custom Enhancements in Digital Sports Broadcasts"; Proceedings of the sixth international conference on 3D Web technology 2001; pp. 101-107.

\* cited by examiner

*Primary Examiner* — Wing Chan
*Assistant Examiner* — Hitesh Patel

(57) ABSTRACT

A system for video detection and enhancement of a sport object during a sport contest. The system includes the sport object configured to phosphoresce at a selected non-visible frequency; a video collection and separation apparatus configured to detect visible light from a scene that includes the sport object and to detect phosphorescence radiation emitted by the sport object at the selected non-visible frequency, configured to separate the detected visible light from the detected phosphorescence radiation, and configured to create a visible light signal from the detected visible light and to create a phosphorescent signal from the detected phosphorescence radiation; an enhancement module configured to receive and to enhance the phosphorescent signal, and a merge module configured to receive and to recombine a resulting enhanced-phosphorescent signal and the visible light signal into a recombined signal.

21 Claims, 13 Drawing Sheets

VIDEO DETECTION AND ENHANCEMENT OF A SPORT OBJECT

BACKGROUND

In many sports, such as football, baseball, basketball, hockey, tennis, and others, a sport object such as a ball or a puck is moved in a specified manner in order to score points and win the contest. The object may be passed or moved between different players of the sport with the objective of scoring points by forcing the object past, through, or into a goal. For instance in football, the football can be handed off or passed between players on the same team to move the football toward the goal line. Among other means, points are scored by a football team if a member of that team crosses the goal line with the football or catches a pass in the end zone. A baseball hit over a wall at the edge of the playing field scores a point, i.e., a run, while a baseball hit within the playing field but sufficiently far away from members of the defending team also has the possibility of scoring. The objective in tennis, on the other hand, is to keep the ball within a specified playing area but hopefully where it is difficult or impossible for the player's opponent to return it to the playing area on the opposite side of the net.

The relatively small size of the sport object and its often rapid movement during play can make it difficult for television viewers to find and follow the object while watching the sport during real-time motion and sometimes even during slow motion replays. Various techniques have been used to detect the position of the sport object and to track its movement. In particular, hockey pucks have been fabricated with infrared emitting diodes mounted flush on their surfaces with the emitted infrared radiation being detected by special cameras. Proposals have also employed optical recognition or pattern recognition techniques.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
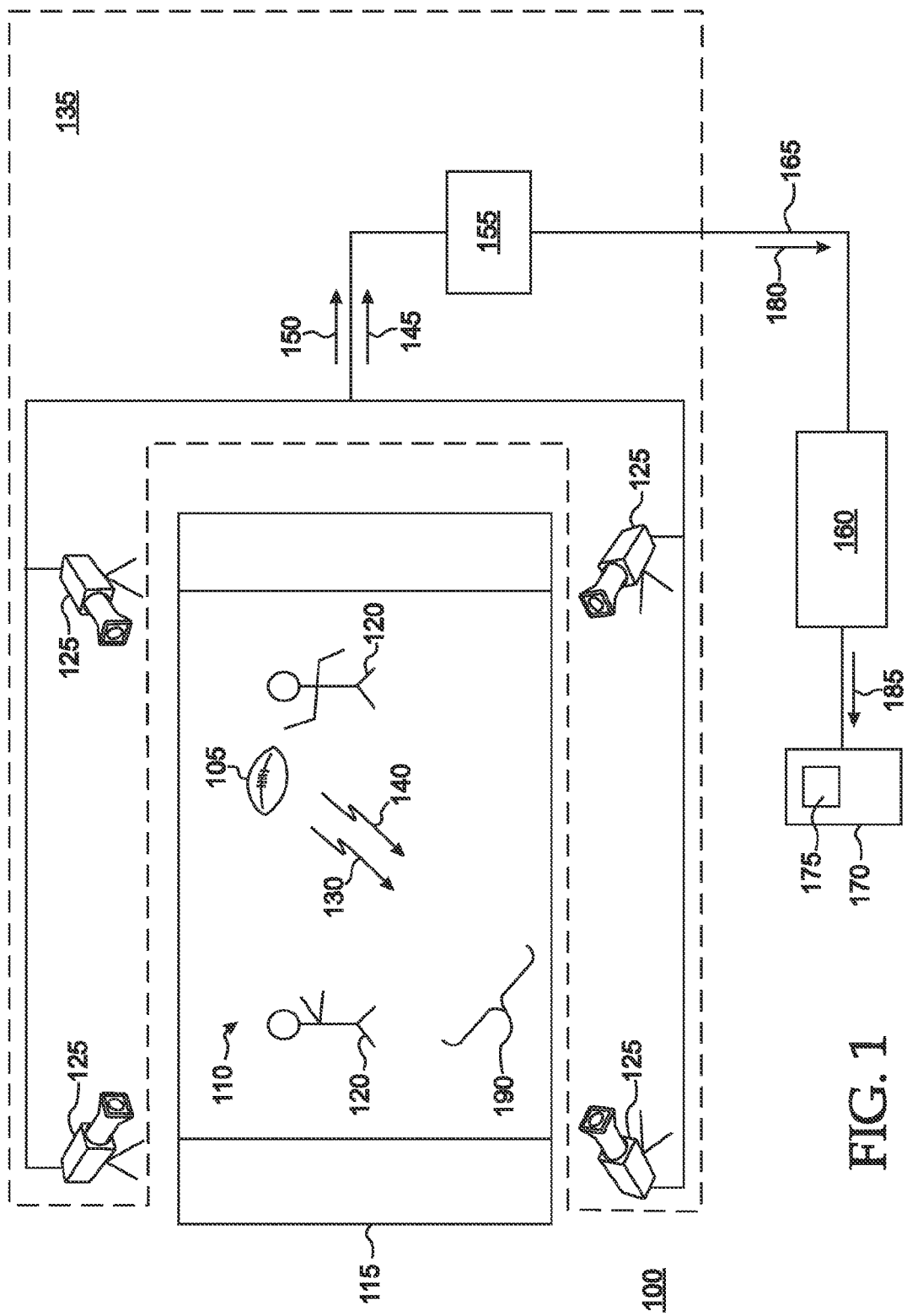
FIG. 1 is a drawing of a system for video detection and enhancement of a sport object during a sport contest as described in various representative embodiments.

As shown in the drawings for purposes of illustration, novel techniques are disclosed herein of a system for video detection and enhancement of a sport object during a sport contest. The sport object could be a football, baseball, basketball, tennis ball, hockey puck, or the like. It could also be a piece of clothing or other item worn by a participant or participants in the sport contest or an official or officials officiating the sport contest. It could also be any implement used in the sport contest. In a representative embodiment, the sport object is configured to phosphoresce at a selected non-visible frequency. Visible light from a scene that includes the sport object is detected, as is phosphorescence emitted by the sport object at the selected non-visible frequency. The phosphorescent signal from the sport object is separated from the visible light from the scene, visually enhanced for display, and then recombined with the visual light prior to display.

In another representative embodiment, the sport object is configured to reflect infrared radiation at a selected non-visible frequency. Visible light from a scene that includes the sport object is detected, as is infrared radiation reflected by the sport object at the selected non-visible frequency. The reflected infrared radiation signal from the sport object is separated from the visible light reflected by the scene, visually enhanced for display, and then recombined with the visual light prior to display.

Previous techniques for enhancing the image of a sport object have used hockey pucks fabricated with infrared emitting diodes mounted flush on their surfaces with the emitted infrared radiation being detected by special cameras. Techniques have also used optical recognition or pattern recognition techniques to locate and track the sport object.

In the following detailed description and in the several figures of the drawings, like elements are identified with like reference numerals.

FIG. 1 is a drawing of a system 100 for video detection and enhancement of a sport object 105 during a sport contest 110 as described in various representative embodiments. In FIG.

1, a sport contest 110 is being played on a sports field 115. For clarity and ease of illustration, only two players 120 are shown participating in the sport contest 110 which in FIG. 1 is a football game. One of the players 120 is shown passing a football (the sport object 105) to the other player 120.

A video collection and separation apparatus 135 comprises multiple video cameras 125 and a first signal modification module 155. A scene 190 or view 190 of the sport contest 110 which can include the sport object 105 is captured by one or more of the cameras 125. Outputs from the video cameras 125 are coupled to the first signal modification module 155. Output of the first signal modification module 155 is coupled to a second signal modification module 160 via a transfer apparatus 165 and a transferred signal 180 is transferred via the transfer apparatus 165 from the first signal modification module 155 to the second signal modification module 160. The transfer apparatus 165 could comprise a radio-frequency cable, a high-frequency radio transmission system, the Internet, or other appropriate high-frequency transfer means. Output of the second signal modification module 160 is coupled to a video presentation apparatus 170 having a video display 175 which could be a computer 170 having a video screen 175 or a television receiver 170 having a television screen 175. A display signal 185 is transferred from the second signal modification module 160 to the video presentation apparatus 170. The second signal modification module 160 and the video presentation apparatus 170 could be located in proximity of the video collection and separation apparatus 135 or it could be remotely located from the video collection and separation apparatus 135.

Multiple video cameras 125 are set up around the sports field 115 to capture images of the sport contest 110. Also in FIG. 1, the sport object 105 is configured to emit phosphorescent radiation 130 (phosphoresce) at a selected non-visible frequency. A video collection and separation apparatus 135, is configured to detect visible light 140 from a scene 190 that includes the sport object 105 and to detect the phosphorescent radiation 130 emitted by the sport object 105 at the selected non-visible frequency. The video collection and separation apparatus 135, is also configured to separate the detected visible light 140 from the detected phosphorescence 130, to create a visible light signal 145 from the detected visible light 140, and to create a phosphorescent signal 150 from the detected phosphorescence 130. The separation and creation could be effected in each of the video cameras 125 or other appropriate modules. Optical filters in combination with or without beam splitters can be used to separate the visible light 140 from the phosphorescent radiation 130. In various representative embodiments, the phosphorescent signal 150 can be enhanced in the first signal modification module 155 in the video collection and separation apparatus 135 or in the second signal modification module 160. Also in various representative embodiments, the modified phosphorescent signal 150 (see discussion of FIG. 3A for a discussion of the enhanced phosphorescent signal 330*a*) and the visible light signal 145 can be recombined in the first signal modification module 155 in the video collection and separation apparatus 135 or in the second signal modification module 160. Various representative embodiments of the first signal modification module 155 and of the second signal modification module 160 will be discussed with respect to FIGS. 3A-3F.

Figure 2:
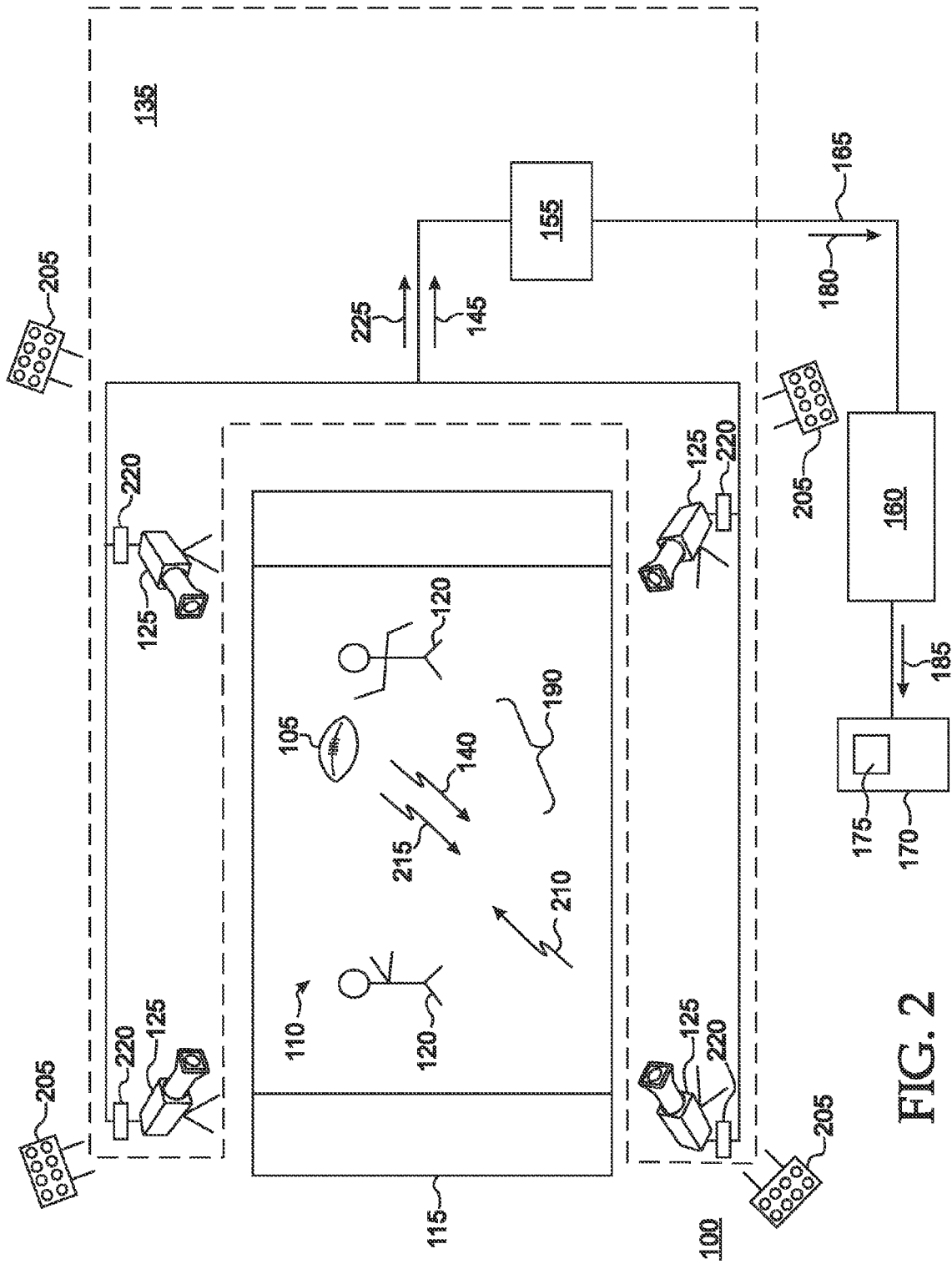
FIG. 2 is a drawing of another system for video detection and enhancement of a sport object during a sport contest as described in various representative embodiments.

FIG. 2 is a drawing of another system 100 for video detection and enhancement of a sport object 105 during a sport contest 110 as described in various representative embodiments. FIG. 2 is similar to FIG. 1 in that a sport contest 110 is being played on a sports field 115. Again for clarity and ease of illustration, only two players 120 are shown participating in the sport contest 110. One of the players 120 is shown passing a football (the sport object 105) to the other player 120. FIG. 2 differs from FIG. 1 in that the sports field 115 is illuminated by an illumination apparatus 205 configured to emit infrared radiation 210 at a selected infrared frequency and in that the sport object 105 is configured to reflect the emitted infrared radiation 210 as reflected infrared radiation 215 at the selected infrared frequency. The illumination apparatus 205 can either emit continuous infrared radiation 210 or emit modulated infrared radiation 210.

A video collection and separation apparatus 135 comprises multiple video cameras 125 and a first signal modification module 155. A scene 190 or view 190 of the sport contest 110 which can include the sport object 105 is captured by one or more of the cameras 125. Should the illumination apparatus 205 illuminate the sports field 115 with modulated infrared radiation 210, each video camera 125 can comprise a demodulation unit 220 or have a demodulation unit 220 coupled to its output. In such case, outputs of the demodulation units 220 are coupled to the first signal modification module 155. Output of the first signal modification module 155 is coupled to a second signal modification module 160 via a transfer apparatus 165 and a transferred signal 180 is transferred via the transfer apparatus 165 from the first signal modification module 155 to the second signal modification module 160. The transfer apparatus 165 could comprise a radio-frequency cable, a high-frequency radio transmission system, the Internet, or other appropriate high-frequency transfer means. Output of the second signal modification module 160 is coupled to a video presentation apparatus 170 having a video display 175 which could be a computer 170 having a video screen 175 or a television receiver 170 having a television screen 175. A display signal 185 is transferred from the second signal modification module 160 to the video presentation apparatus 170. The second signal modification module 160 and the video presentation apparatus 170 could be located in proximity of the video collection and separation apparatus 135 or it could be remotely located from the video collection and separation apparatus 135.

Multiple video cameras 125 are set up around the sports field 115 to capture images of the sport contest 110. In FIG. 2 as previously stated, the sport object 105 is configured to passively reflect infrared radiation 210 as reflected infrared radiation 215 at a selected infrared frequency. A video collection and separation apparatus 135, is configured to detect visible light 140 from a scene 190 that includes the sport object 105 and to detect the reflected infrared radiation 215 reflected by the sport object 105 at the selected infrared frequency. The video collection and separation apparatus 135, is also configured to separate the detected visible light 140 from the detected reflected infrared radiation 215, to create a visible light signal 145 from the detected visible light 140, and to create a reflected-infrared signal 225 from the detected reflected infrared radiation 215. The separation and creation could be effected in each of the video cameras 125 or other appropriate modules. Optical filters in combination with or without beam splitters can be used to separate the visible light 140 from the infrared radiation 210,215. In various representative embodiments, the reflected-infrared signal 225 can be enhanced in the first signal modification module 155 in the video collection and separation apparatus 135 or in the second signal modification module 160. Also in various representative embodiments, the modified reflected-infrared signal 225 (see discussion of FIG. 3A for a discussion of the enhanced-infrared signal 330*b*) and the visible light signal 145 can be recombined in the first signal modification module 155 in the video collection and separation apparatus 135 or in the second signal modification module 160. Various representative embodiments of the first signal modification module 155 and of the second signal modification module 160 will be discussed with respect to FIGS. 3A-3F.

Figure 3A:
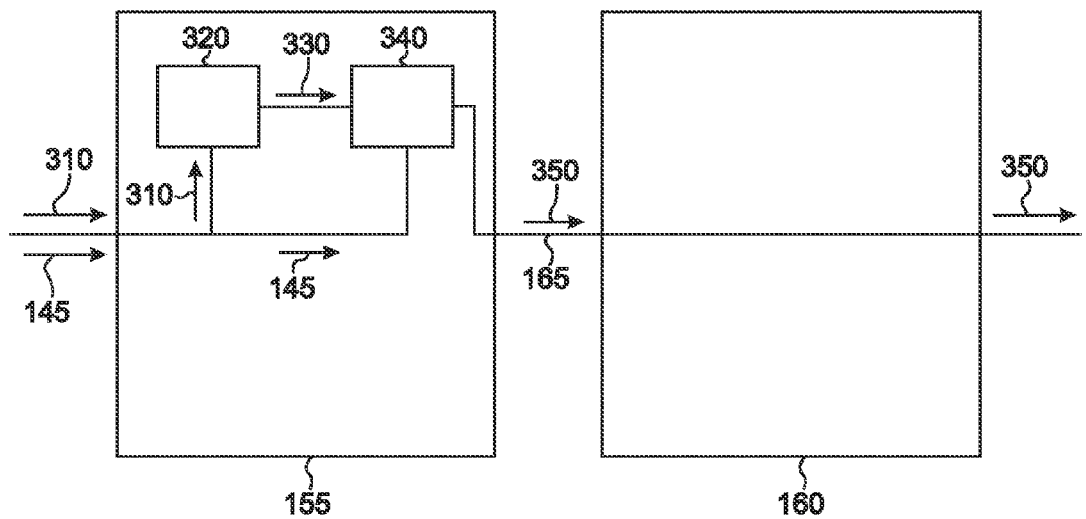
FIG. 3A is a drawing of a representative embodiment of the first signal modification module and/or the second signal modification module of FIGS. 1 and 2.

FIG. 3A is a drawing of a representative embodiment of the first signal modification module 155 and/or the second signal modification module 160 of FIGS. 1 and 2. In FIG. 3A, an object signal 310, which could be the phosphorescent signal 150 of FIG. 1 or the reflected-infrared signal 225 of FIG. 2, and the visible light signal 145 are received at the input of the first signal modification module 155. The object signal 310 is transferred to the input of an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330*a* for the representative embodiment of FIG. 1 or an enhanced-infrared signal 330*b* for the representative embodiment of FIG. 2. Neither the enhanced-phosphorescent signal 330*a* nor the enhanced-infrared signal 330*b* are otherwise explicitly identified in any of the figures. The enhanced signal 330 from the output of the enhancement module 320 and the visual light signal 145 from the input to the first signal modification module 155 are transferred to a merge module 340 configured to receive and to recombine the enhanced signal 330 and the visible light signal 145 into a recombined signal 350. For the embodiment of FIG. 3A, the second signal modification module 160 is not used and is only included in FIG. 3A for consistency with FIGS. 1 and 2. Thus, the recombined signal 350 is transferred directly from the first signal modification module 155 to the video presentation apparatus 170 via the transfer apparatus 165.

Figure 3B:
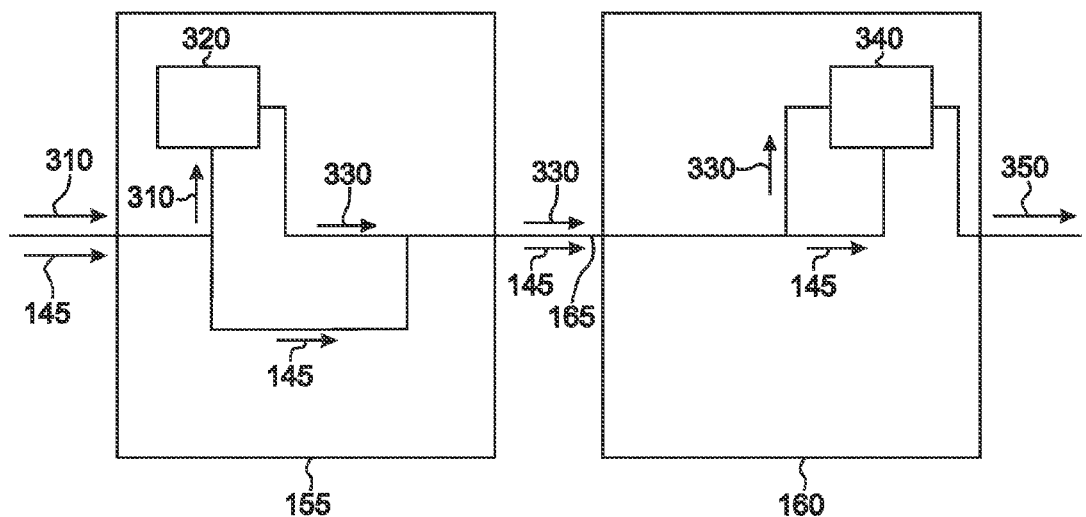
FIG. 3B is a drawing of another representative embodiment of the first signal modification module and/or the second signal modification module of FIGS. 1 and 2.

FIG. 3B is a drawing of another representative embodiment of the first signal modification module 155 and/or the second signal modification module 160 of FIGS. 1 and 2. In FIG. 3B, an object signal 310, which could be the phosphorescent signal 150 of FIG. 1 or the reflected-infrared signal 225 of FIG. 2, and the visible light signal 145 are received at the input of the first signal modification module 155. The object signal 310 is transferred to the input of an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330*a* for the representative embodiment of FIG. 1 or an enhanced-infrared signal 330*b* for the representative embodiment of FIG. 2. Again, neither the enhanced-phosphorescent signal 330*a* nor the enhanced-infrared signal 330*b* are otherwise explicitly identified in any of the figures. The enhanced signal 330 from the output of the enhancement module 320 and the visual light signal 145 from the input to the first signal modification module 155 are transferred to the output of the first signal modification module 155 and from there to the input to the second signal modification module 160 via the transfer apparatus 165. From the input to the second signal modification module 160, the enhanced signal 330 and the visual light signal 145 are transferred to a merge module 340 in the second signal modification module 160 configured to receive and to recombine the enhanced signal 330 and the visible light signal 145 into a recombined signal 350. Then, the recombined signal 350 is transferred from the second signal modification module 160 to the video presentation apparatus 170.

Figure 3C:
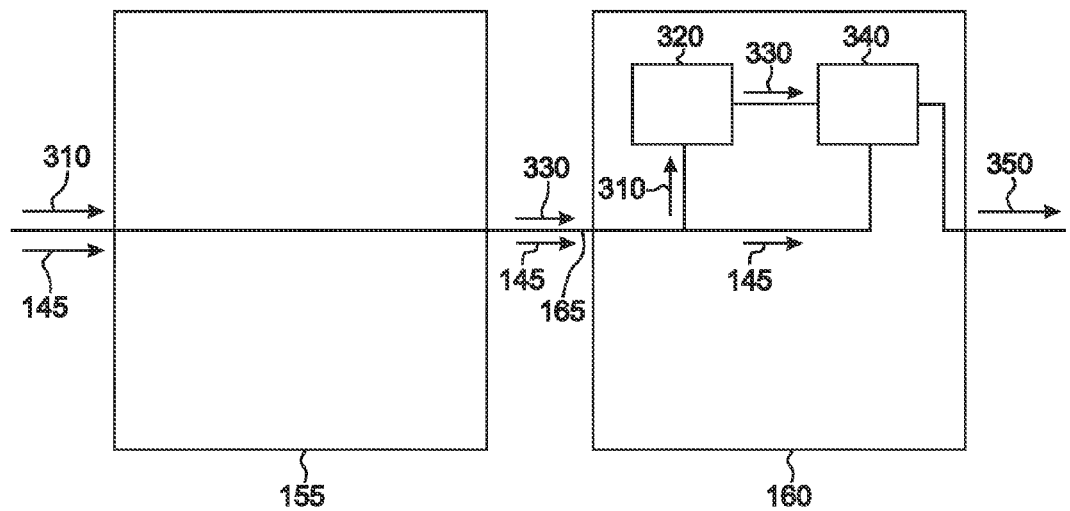
FIG. 3C is a drawing of still another representative embodiment of the first signal modification module and/or the second signal modification module of FIGS. 1 and 2.

FIG. 3C is a drawing of still another representative embodiment of the first signal modification module 155 and/or the second signal modification module 160 of FIGS. 1 and 2. In FIG. 3C, an object signal 310, which could be the phosphorescent signal 150 of FIG. 1 or the reflected-infrared signal 225 of FIG. 2, and the visible light signal 145 are received at the input of the first signal modification module 155. For the embodiment of FIG. 3C, the first signal modification module 155 is not used and is only included in FIG. 3C for consistency with FIGS. 1 and 2. Thus, the object signal 310 and the visible light signal 145 are transferred directly to the second signal modification module 160 via the transfer apparatus 165. The object signal 310 is transferred to the input of an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330*a* for the representative embodiment of FIG. 1 or an enhanced-infrared signal 330*b* for the representative embodiment of FIG. 2. Once again, neither the enhanced-phosphorescent signal 330*a* nor the enhanced-infrared signal 330*b* are otherwise explicitly identified in any of the figures. The enhanced signal 330 from the output of the enhancement module 320 and the visual light signal 145 from the input to the second signal modification module 160 are transferred to a merge module 340 in the second signal modification module 160 configured to receive and to recombine the enhanced signal 330 and the visible light signal 145 into a recombined signal 350. Then, the recombined signal 350 is transferred to the video presentation apparatus 170.

Figure 3D:
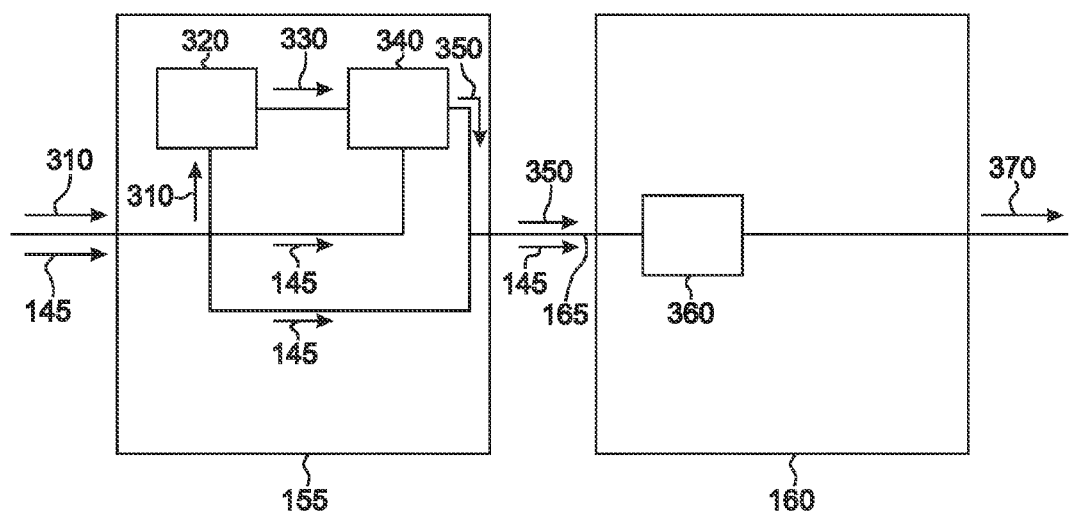
FIG. 3D is a drawing of yet another representative embodiment of the first signal modification module and/or the second signal modification module of FIGS. 1 and 2.

FIG. 3D is a drawing of yet another representative embodiment of the first signal modification module 155 and/or the second signal modification module 160 of FIGS. 1 and 2. In FIG. 3D, an object signal 310, which could be the phosphorescent signal 150 of FIG. 1 or the reflected-infrared signal 225 of FIG. 2, and the visible light signal 145 are received at the input of the first signal modification module 155. The object signal 310 is transferred to the input of an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330*a* for the representative embodiment of FIG. 1 or an enhanced-infrared signal 330*b* for the representative embodiment of FIG. 2. Once again, neither the enhanced-phosphorescent signal 330*a* nor the enhanced-infrared signal 330*b* are otherwise explicitly identified in any of the figures. The enhanced signal 330 from the output of the enhancement module 320 and the visual light signal 145 from the input to the first signal modification module 155 are transferred to a merge module 340 configured to receive and to recombine the enhanced signal 330 and the visible light signal 145 into a recombined signal 350. Both the recombined signal 350 from the output of the merge module 340 and the visible light signal 145 from the input to the first signal modification module 155 are transferred to the input of a switch module 360 in the second signal modification module 160 via the transfer apparatus 165. The output of the switch module 360 transfers a display signal 370 to the video presentation apparatus 170. The switch module is configured such that a user can decide whether to display either the recombined signal 350, i.e., the visible light signal 145 combined with the enhanced signal 330, or the visible light signal 145 without enhancement of the sport object 105. Thus, the display signal 370 is either the recombined signal 350 or the visible light signal 145.

Figure 3E:
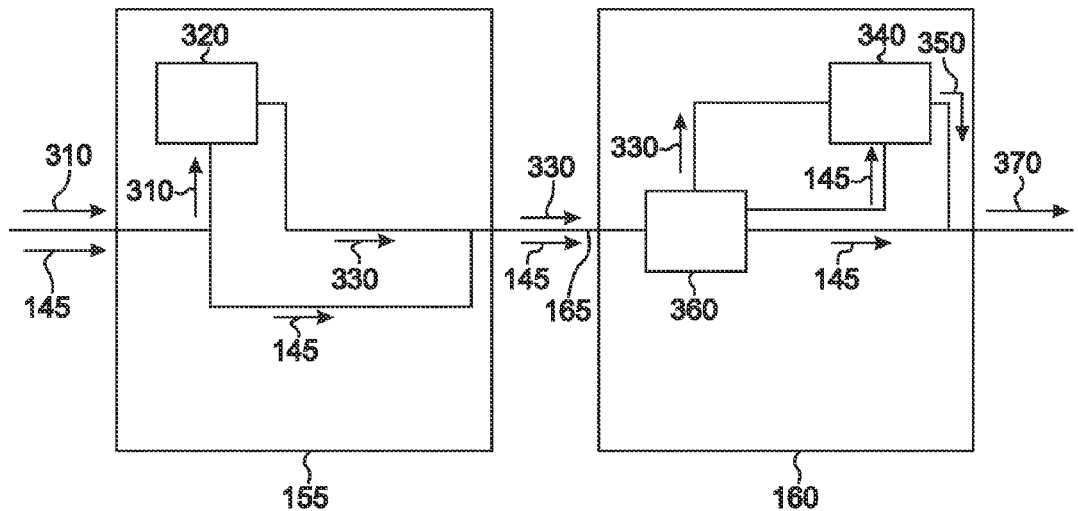
FIG. 3E is a drawing of still yet another representative embodiment of the first signal modification module and/or the second signal modification module of FIGS. 1 and 2.

FIG. 3E is a drawing of still yet another representative embodiment of the first signal modification module 155 and/or the second signal modification module 160 of FIGS. 1 and 2. In FIG. 3E, an object signal 310, which could be the phosphorescent signal 150 of FIG. 1 or the reflected-infrared signal 225 of FIG. 2, and the visible light signal 145 are received at the input of the first signal modification module 155. The object signal 310 is transferred to the input of an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330a for the representative embodiment of FIG. 1 or an enhanced-infrared signal 330b for the representative embodiment of FIG. 2. Once again, neither the enhanced-phosphorescent signal 330a nor the enhanced-infrared signal 330b are otherwise explicitly identified in any of the figures. The enhanced signal 330 from the output of the enhancement module 320 and the visual light signal 145 from the input to the first signal modification module 155 are transferred to the input to a switch module 360 in the second signal modification module 160 via the transfer apparatus 165. The output of the switch module 360 either transfers the visible light signal 145 to the output of the second signal modification module 160, or the output of the switch module 360 transfers the enhanced signal 330 and the visual light signal 145 to a merge module 340 configured to receive and to recombine the enhanced signal 330 and the visible light signal 145 into a recombined signal 350. If the output of the switch module 360 transfers the visible light signal 145 to the output of the second signal modification module 160, the display signal 370 shown in FIG. 3E at the output of the second signal modification module 160 is the same as the visible light signal 145. If the output of the switch module 360 transfers the enhanced signal 330 and the visual light signal 145 to the merge module 340, the display signal 370 shown in FIG. 3E at the output of the second signal modification module 160 is the same as the recombined signal 350. The output of the second signal modification module 160 transfers a display signal 370 to the video presentation apparatus 170. The switch module is configured such that a user can decide whether to display either the recombined signal 350, i.e., the visible light signal 145 combined with the enhanced signal 330, or the visible light signal 145 without enhancement of the sport object 105. Thus, the display signal 370 is either the recombined signal 350 or the visible light signal 145.

Figure 3F:
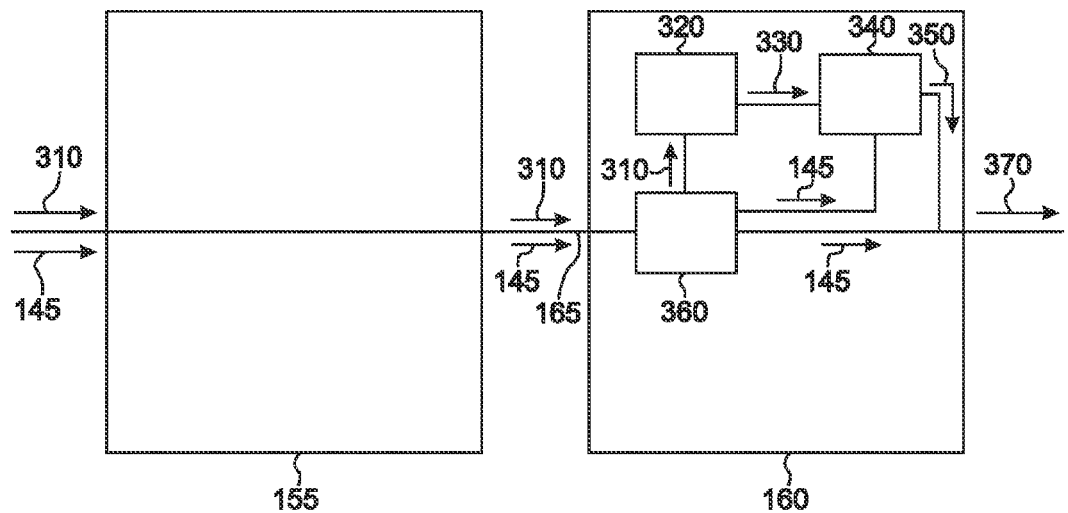
FIG. 3F is a drawing of still another representative embodiment of the first signal modification module and/or the second signal modification module of FIGS. 1 and 2.

FIG. 3F is a drawing of still another representative embodiment of the first signal modification module 155 and/or the second signal modification module 160 of FIGS. 1 and 2. In FIG. 3F, an object signal 310, which could be the phosphorescent signal 150 of FIG. 1 or the reflected-infrared signal 225 of FIG. 2, and the visible light signal 145 are received at the input of the first signal modification module 155. For the embodiment of FIG. 3F, the first signal modification module 155 is not used and is only included in FIG. 3F for consistency with FIGS. 1 and 2. Thus, the object signal 310 and the visible light signal 145 are transferred directly to the input of a switch module 360 in the second signal modification module 160 via the transfer apparatus 165. The output of the switch module 360 either transfers the visible light signal 145 to the output of the second signal modification module 160, or the output of the switch module 360 transfers the object signal 310 to an enhancement module 320 configured to receive and to enhance the object signal 310, i.e., the phosphorescent signal 150 of FIG. 1 or the reflected-infrared signal 225 of FIG. 2, producing an enhanced signal 330, i.e., an enhanced-phosphorescent signal 330a for the representative embodiment of FIG. 1 or an enhanced-infrared signal 330b for the representative embodiment of FIG. 2 and transfers the visible light signal 145 to a merge module 340. In the latter case, the merge module 340 is configured to receive and to recombine the enhanced signal 330 and the visible light signal 145 into a recombined signal 350. Once again, neither the enhanced-phosphorescent signal 330a nor the enhanced-infrared signal 330b are otherwise explicitly identified in any of the figures. If the output of the switch module 360 transfers the visible light signal 145 to the output of the second signal modification module 160, the display signal 370 shown in FIG. 3F at the output of the second signal modification module 160 is the same as the visible light signal 145. If the output of the switch module 360 transfers the object signal 310 to the enhancement module 320 and the visual light signal 145 to the merge module 340, the display signal 370 shown in FIG. 3F at the output of the second signal modification module 160 is the same as the recombined signal 350. The output of the second signal modification module 160 transfers a display signal 370 to the video presentation apparatus 170. The switch module is configured such that a user can decide whether to display either the recombined signal 350, i.e., the visible light signal 145 combined with the enhanced signal 330, or the visible light signal 145 without enhancement of the sport object 105. Thus, the display signal 370 is either the recombined signal 350 or the visible light signal 145.

In FIGS. 3A-3C, the user does not have the option of displaying only the visible light signal 145 on the video display 175. Whereas in FIGS. 3D-3F, the user does have the option of displaying only the visible light signal 145 on the video display 175. In FIG. 3A, the object signal 310 is enhanced in the first signal modification module 155 locally located in the video collection and separation apparatus 135, and the enhanced signal 330 and the visible light signal 145 are recombined in the first signal modification module 155 locally located in the video collection and separation apparatus 135. In FIG. 3B, the object signal 310 is enhanced in the first signal modification module 155 locally located in the video collection and separation apparatus 135, and the enhanced signal 330 and the visible light signal 145 are recombined in the second signal modification module 160 remotely located with the video presentation apparatus 170. In FIG. 3C, the object signal 310 is enhanced in the second signal modification module 160 remotely located with the video presentation apparatus 170, and the enhanced signal 330 and the visible light signal 145 are recombined in the second signal modification module 160 remotely located with the video presentation apparatus 170. In FIG. 3D, the object signal 310 is enhanced in the first signal modification module 155 locally located in the video collection and separation apparatus 135, and the enhanced signal 330 and the visible light signal 145 are recombined in the first signal modification module 155 locally located in the video collection and separation apparatus 135. In FIG. 3E, the object signal 310 is enhanced in the first signal modification module 155 locally located in the video collection and separation apparatus 135, and the enhanced signal 330 and the visible light signal 145 are recombined in the second signal modification module 160 remotely located with the video presentation apparatus 170. In FIG. 3F, the object signal 310 is enhanced in the second signal modification module 160 remotely located with the video presentation apparatus 170, and the enhanced signal 330 and the visible light signal 145 are recombined in the second signal modification module 160 remotely located with the video presentation apparatus 170.

Figure 4A:
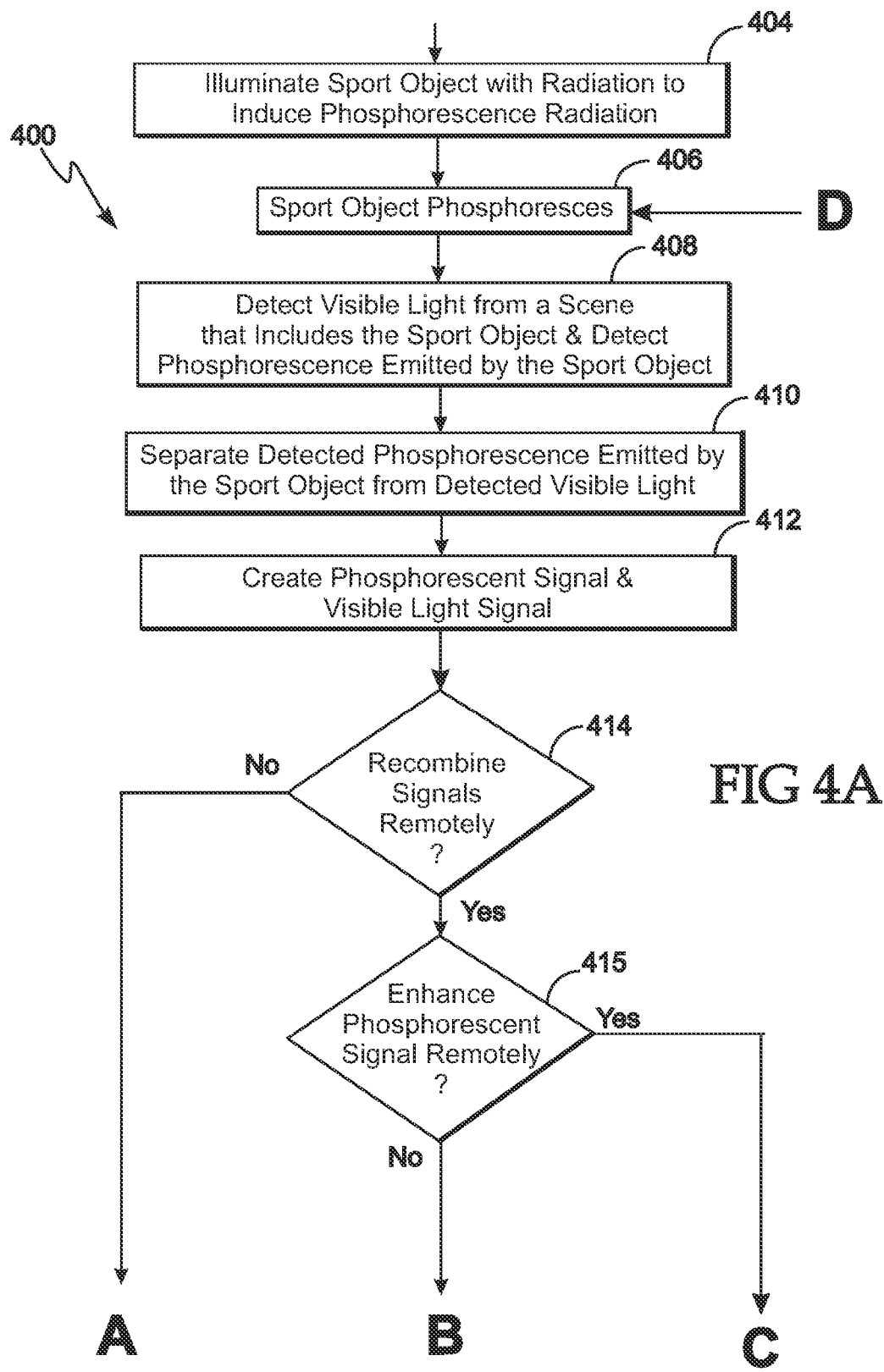
FIG. 4A is a flow chart of a first part of a method for detecting and enhancing a sport object during a sport contest as described in various representative embodiments.

FIG. 4A is a flow chart of a first part of a method 400 for detecting and enhancing a sport object 105 during a sport contest 110 as described in various representative embodiments. In block 404 of FIG. 4A, the sport object 105 is illuminated with radiation capable of inducing phosphorescent radiation 130 at a selected non-visible frequency in the sport object 105. Block 404 then transfers control to block 406.

In block 406, the sport object 105 emits phosphorescent radiation 130 while being used in a sport contest 110. Block 406 then transfers control to block 408.

In block 408, the visible light 140 from a scene 190 that can include the sport object 105 and phosphorescent radiation 130 emitted by the sport object 105 are detected. Such detection can be effected via one or more of the video cameras 125 in FIG. 1. Block 408 then transfers control to block 410.

In block 410, the detected phosphorescent radiation 130 is separated from the visible light 140. Such separation could be effected via the use of separate cameras, one for the phosphorescent radiation 130 and one for the visible light 140, by the use of optical filters, by the use of detectors separately responsive to either the phosphorescent radiation 130 or the visible light 140, or by other acceptable means. Block 410 then transfers control to block 412.

In block 412, a phosphorescent signal 150 is created from the phosphorescent radiation 130 emitted by the sport object 105, and a visible light signal 145 is created from the visible light 140 reflected by the scene 190 from the sport contest 110. Block 412 then transfers control to block 414.

If the phosphorescent signal 150 and the visible light signal 145 are to be recombined remotely, for example in the second signal modification module 160, block 414 transfers control to block 415. Otherwise, block 414 transfers control to block 416 in FIG. 4B.

Figure 4B:
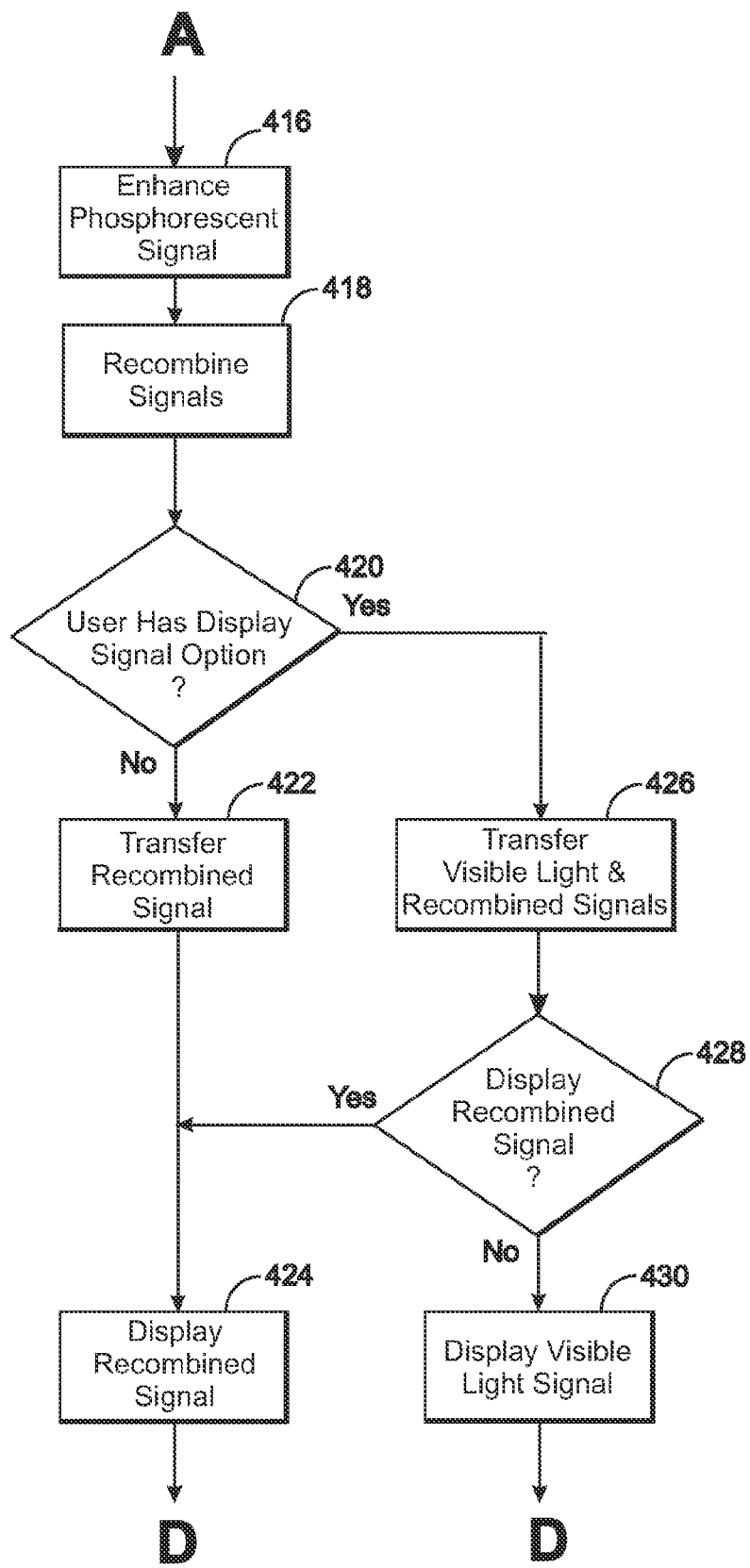
FIG. 4B is a flow chart of a second part of a method for detecting and enhancing a sport object during a sport contest as described in various representative embodiments.
Figure 4C:
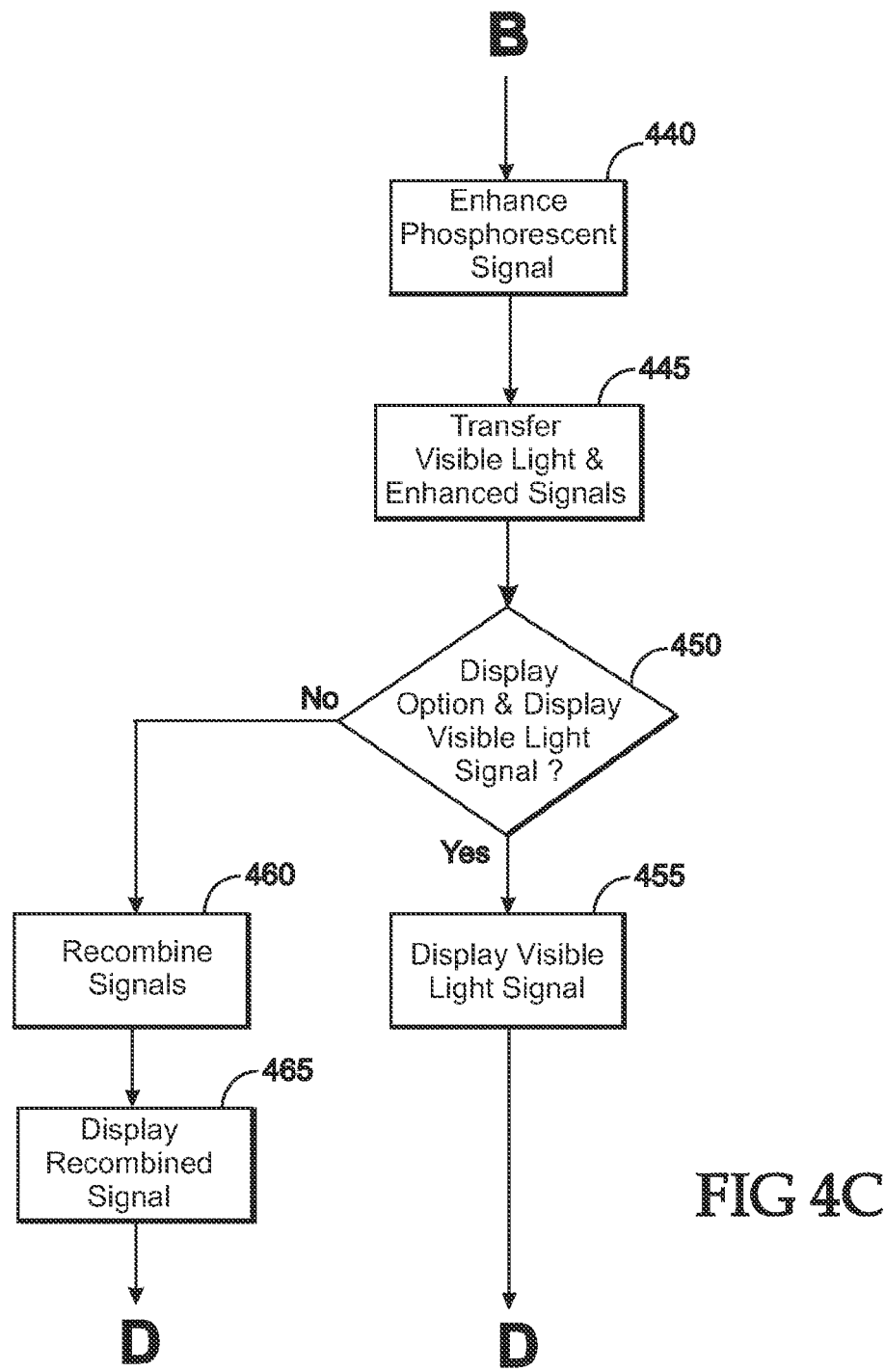
FIG. 4C is a flow chart of a third part of a method for detecting and enhancing a sport object during a sport contest as described in various representative embodiments.
Figure 4D:
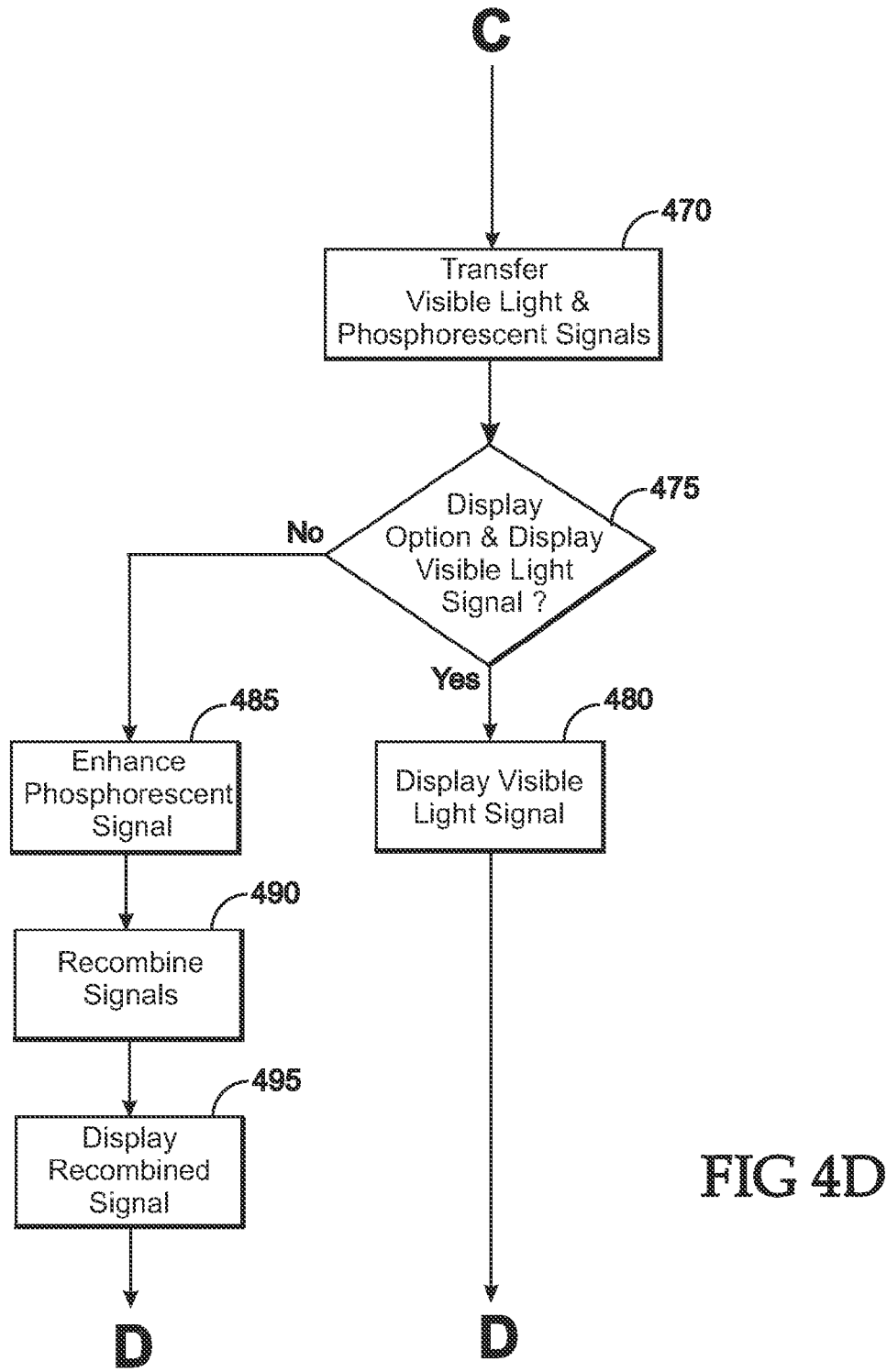
FIG. 4D is a flow chart of a fourth part of a method for detecting and enhancing a sport object during a sport contest as described in various representative embodiments.

If the phosphorescent signal 150 is to be enhanced remotely in the second signal modification module 160, block 415 transfers control to block 470 in FIG. 4D. Otherwise, block 415 transfers control to block 440 in FIG. 4C.

FIG. 4B is a flow chart of a second part of a method 400 for detecting and enhancing a sport object 105 during a sport contest 110 as described in various representative embodiments. In block 416 of FIG. 4B, the phosphorescent signal 150 is enhanced in the first signal modification module 155 to create the enhanced phosphorescent signal 330a. Block 416 then transfers control to block 418.

In block 418, the enhanced phosphorescent signal 330a and the visible light signal 145 are recombined as the recombined signal 350 in the first signal modification module 155. Block 418 then transfers control to block 420.

If the user at the video presentation apparatus 170, has the option of whether to display the recombined signal 350 or the visible light signal 145, block 420 transfers control to block 426, otherwise block 420 transfers control to block 422.

In block 422, the recombined signal 350 is transferred to the video presentation apparatus 170 via the transfer apparatus 165. Block 422 then transfers control to block 424.

In block 424, the recombined signal 424 is displayed on the video display 175 as display signal 370. Block 424 then terminates the process for that frame of video information and transfers control back to block 406 in FIG. 4A for an additional frame of video information.

In Block 426, both the visual light signal 145 and the recombined signal 350 are transferred to the second signal modification module 160 via the transfer apparatus 165. Block 426 then transfers control to block 428.

If the user elects to display the recombined signal 350, block 428 transfers control to block 424. Otherwise, block 428 transfers control to block 430.

In block 430, the visible light signal 145 is displayed on the video display 175 as display signal 370. Block 424 then terminates the process for that frame of video information and transfers control back to block 406 in FIG. 4A for an additional frame of video information.

FIG. 4C is a flow chart of a third part of a method 400 for detecting and enhancing a sport object 105 during a sport contest 110 as described in various representative embodiments. In block 440 of FIG. 4C, the phosphorescent signal 150 is enhanced locally in the first signal modification module 155. Block 440 then transfers control to block 445.

In Block 445, both the visual light signal 145 and the enhanced phosphorescent signal 330a are transferred to the second signal modification module 160 via the transfer apparatus 165. Block 445 then transfers control to block 450.

If the user has the option of displaying the visible light signal 145 instead of the recombined signal 350 and elects to display the visible light signal 145, block 450 transfers control to block 455. Otherwise, block 450 transfers control to block 460.

In block 455, the visible light signal 145 is displayed on the video display 175 as display signal 370. Block 455 then terminates the process for that frame of video information and transfers control back to block 406 in FIG. 4A for an additional frame of video information.

In block 460, the enhanced phosphorescent signal 330a and the visible light signal 145 are recombined as the recombined signal 350 in the second signal modification module 160. Block 460 then transfers control to block 465.

In block 465, the recombined signal 350 is displayed on the video display 175 as display signal 370. Block 465 then terminates the process for that frame of video information and transfers control back to block 406 in FIG. 4A for an additional frame of video information.

FIG. 4D is a flow chart of a fourth part of a method 400 for detecting and enhancing a sport object 105 during a sport contest 110 as described in various representative embodiments. In block 470 of FIG. 4D, both the visual light signal 145 and the phosphorescent signal 150 are transferred to the second signal modification module 160 via the transfer apparatus 165. Block 470 then transfers control to block 475.

If the user has the option of displaying the visible light signal 145 instead of the recombined signal 350 and elects to display the visible light signal 145, block 475 transfers control to block 480. Otherwise, block 475 transfers control to block 485.

In block 480, the visible light signal 145 is displayed on the video display 175 as display signal 370. Block 480 then terminates the process for that frame of video information and transfers control back to block 406 in FIG. 4A for an additional frame of video information.

In block 485, the phosphorescent signal 150 is enhanced remotely in the second signal modification module 160 to create a enhanced phosphorescent signal 330a. Block 485 then transfers control to block 490.

In block 490, the enhanced phosphorescent signal 330a and the visible light signal 145 are recombined as the recombined signal 350 in the second signal modification module 160. Block 490 then transfers control to block 495.

In block 495, the recombined signal 350 is displayed on the video display 175 as display signal 370. Block 495 then terminates the process for that frame of video information and transfers control back to block 406 in FIG. 4A for an additional frame of video information.

Figure 5A:
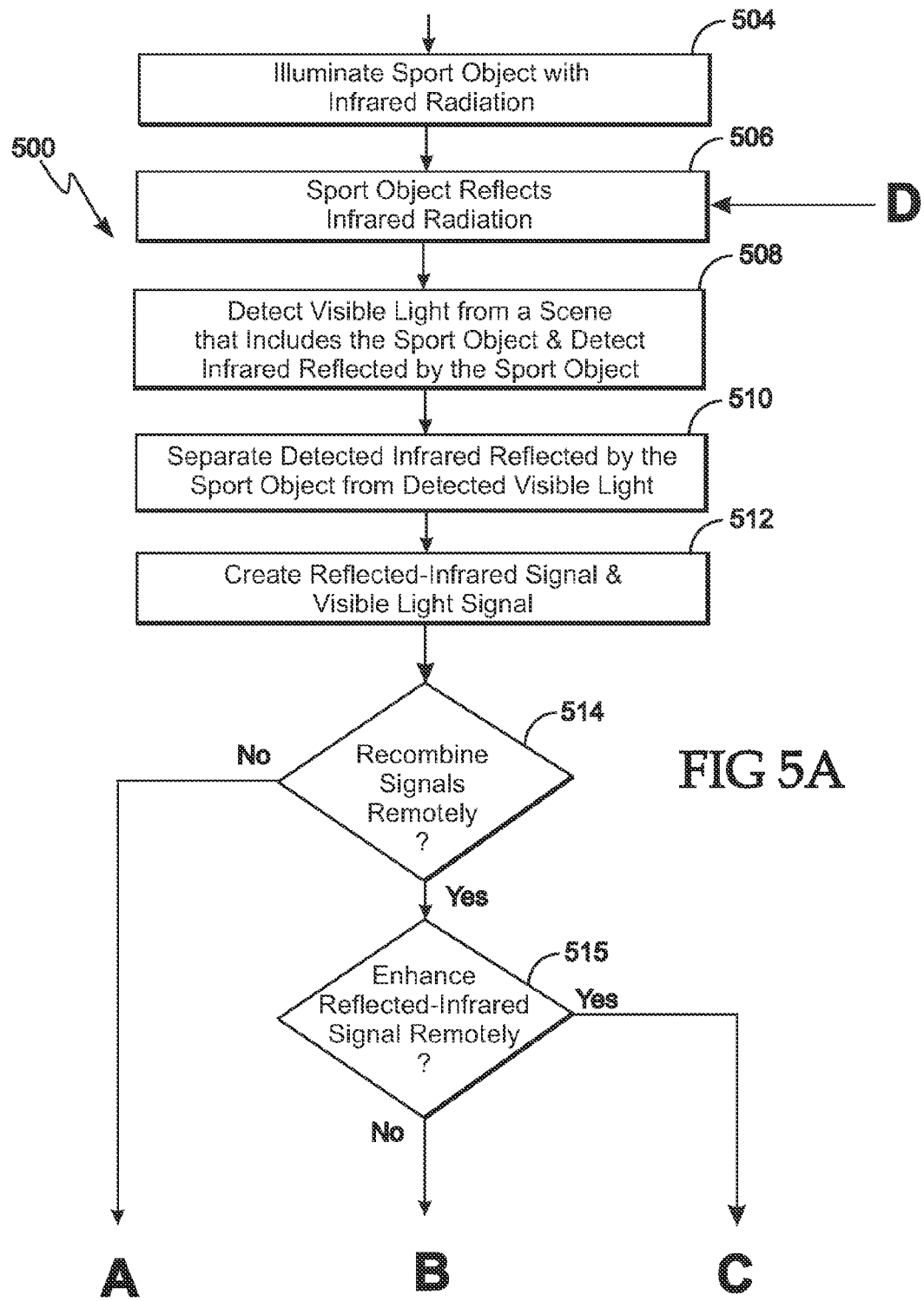
FIG. 5A is a flow chart of a first part of another method for detecting and enhancing a sport object during a sport contest as described in various representative embodiments.

FIG. 5A is a flow chart of a first part of another method 500 for detecting and enhancing a sport object 105 during a sport contest 110 as described in various representative embodiments. In block 504 of FIG. 5A, the sport object 105 is illuminated with infrared radiation 210 at a selected non-visible frequency while being used in a sport contest 110. Block 504 then transfers control to block 506.

In block 506, the sport object 105 reflects the emitted infrared radiation 210 from the illumination apparatus 205 as reflected infrared radiation 215 while being used in the sport contest 110. Block 506 then transfers control to block 508.

In block 508, the visible light 140 from a scene 190 that can include the sport object 105 and reflected infrared radiation 215 from the sport object 105 are detected. Such detection can be effected via one or more of the video cameras 125 in FIG. 2. Block 508 then transfers control to block 510.

In block 510, the detected reflected infrared radiation 215 is separated from the visible light 140. Such separation could be effected via the use of separate cameras, one for the reflected infrared radiation 215 and one for the visible light 140, by the use of optical filters, by the use of detectors separately responsive to either the reflected infrared radiation 215 or the visible light 140, or by other acceptable means. Block 510 then transfers control to block 512.

In block 512, a reflected-infrared signal 225 is created from the reflected infrared radiation 215 reflected by the sport object 105, and a visible light signal 145 is created from the visible light 140 reflected by the scene 190 from the sport contest 110. Block 512 then transfers control to block 514.

If the reflected-infrared signal 225 and the visible light signal 145 are to be recombined remotely, for example in the second signal modification module 160, block 514 transfers control to block 515. Otherwise, block 514 transfers control to block 516.

Figure 5B:
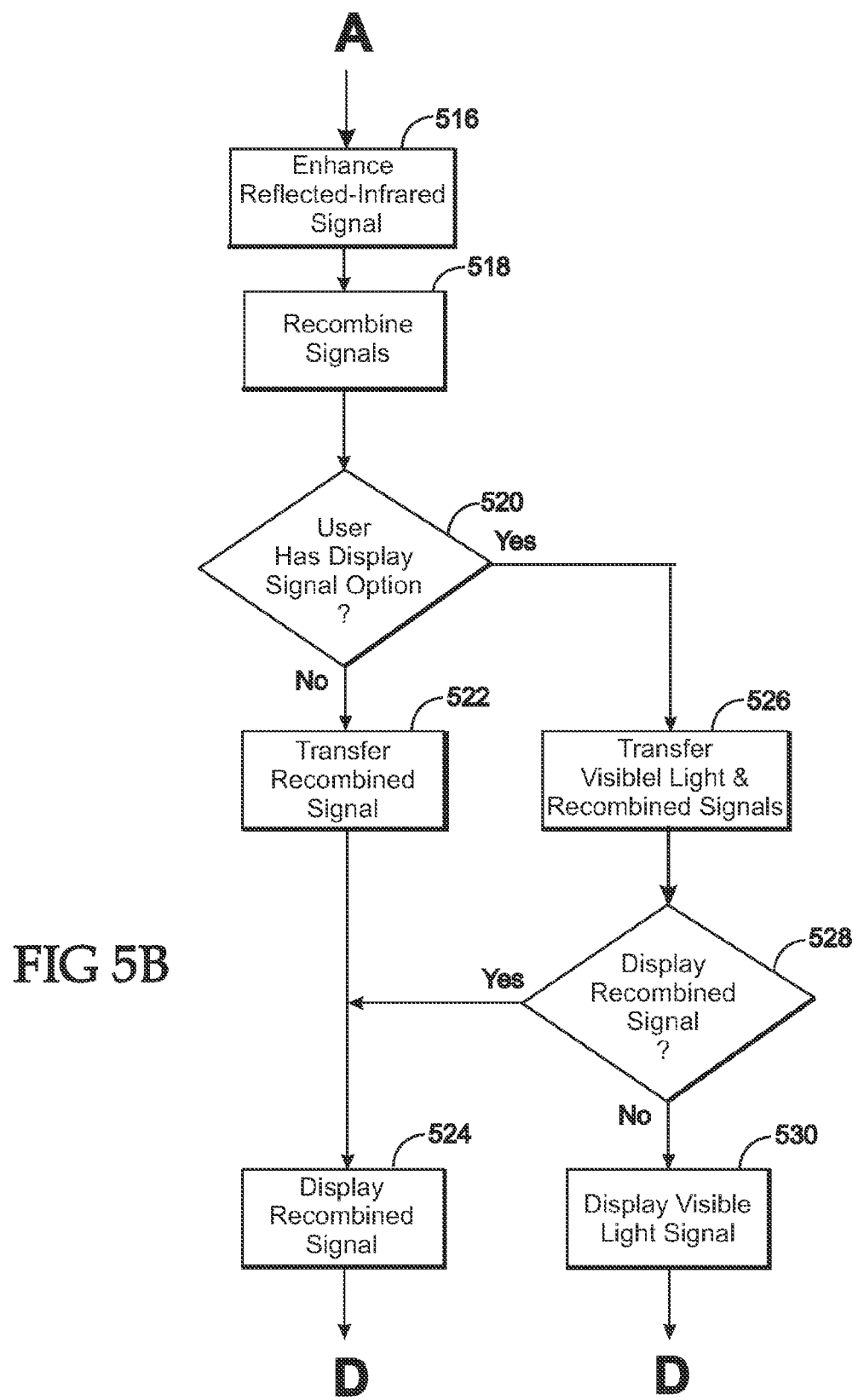
FIG. 5B is a flow chart of a second part of another method for detecting and enhancing a sport object during a sport contest as described in various representative embodiments.
Figure 5C:
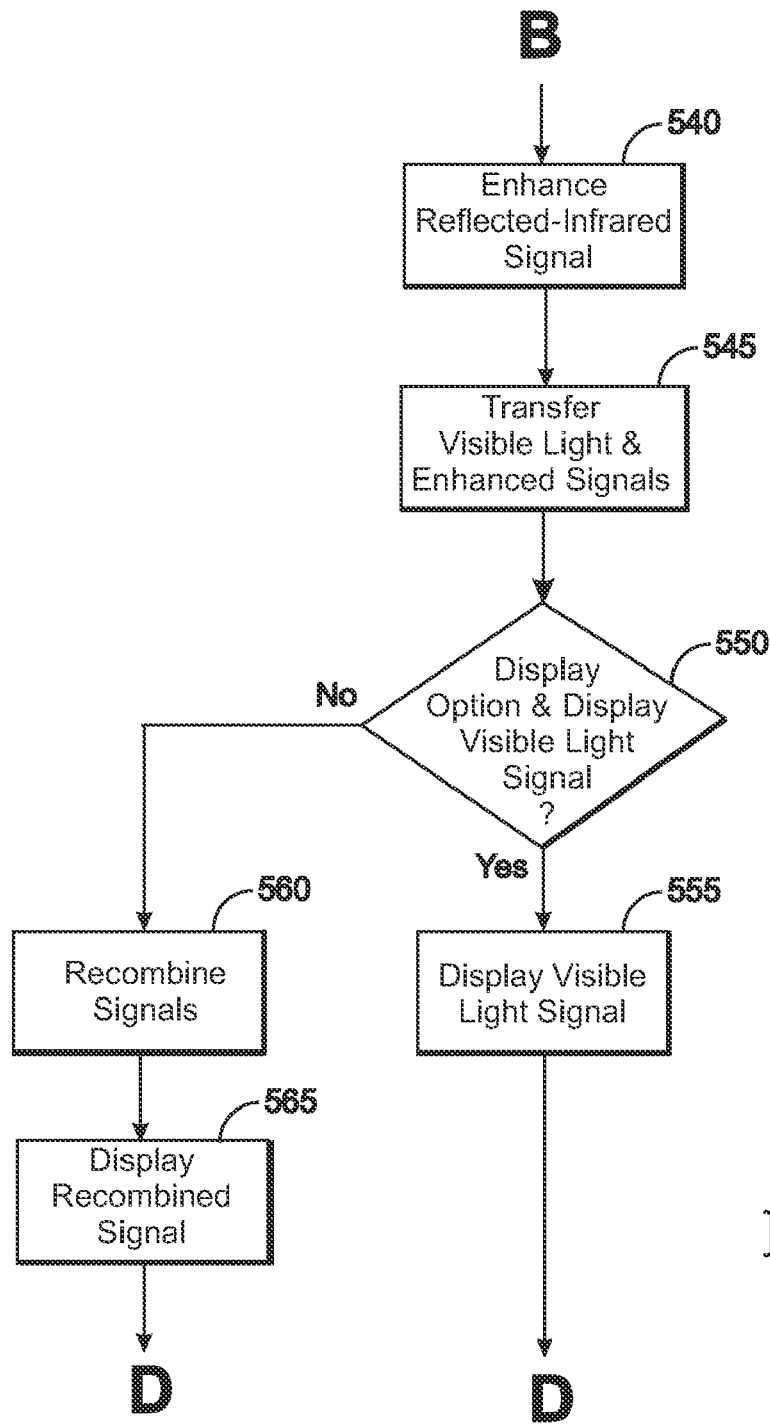
FIG. 5C is a flow chart of a third part of another method for detecting and enhancing a sport object during a sport contest as described in various representative embodiments.
Figure 5D:
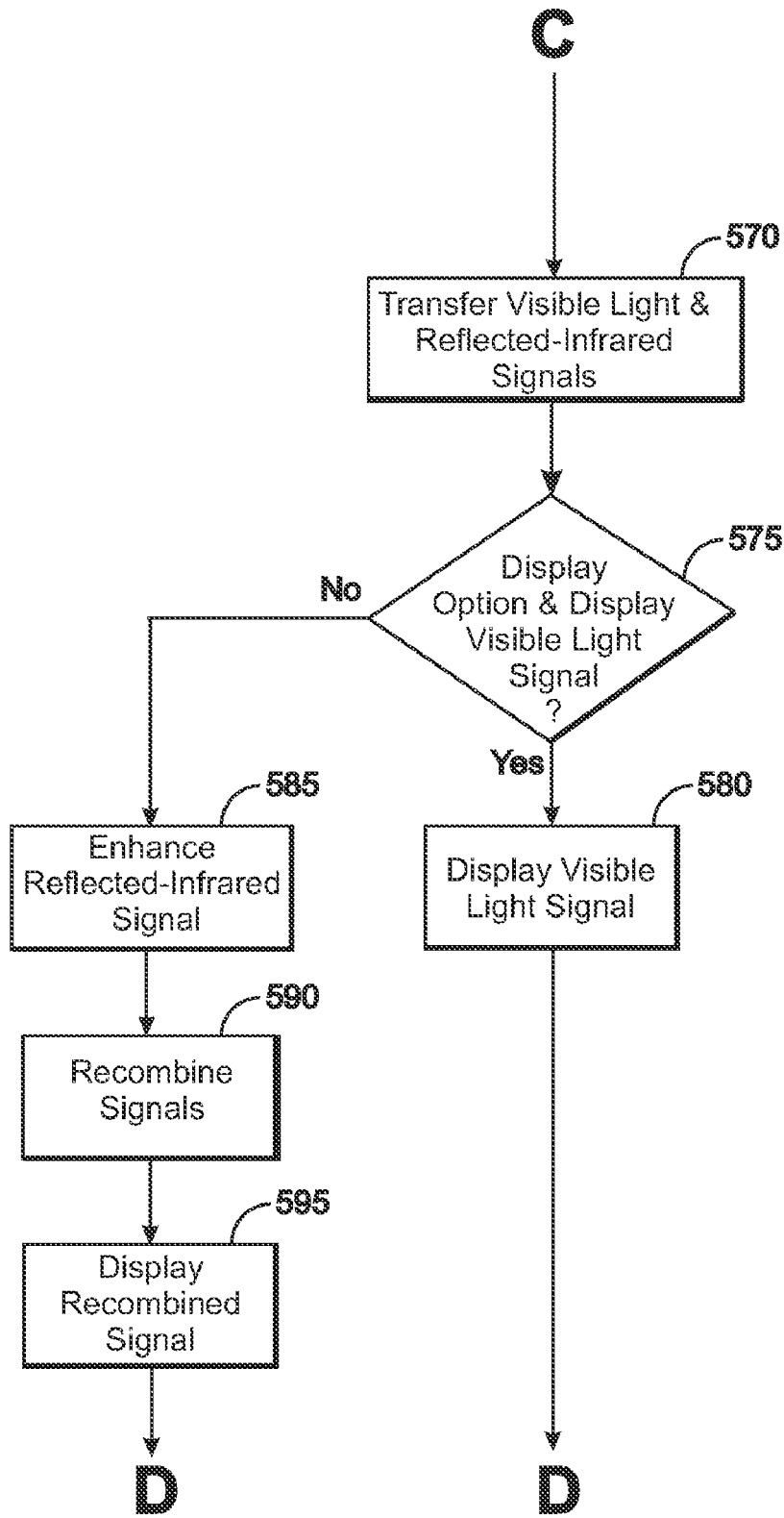
FIG. 5D is a flow chart of a fourth part of another method for detecting and enhancing a sport object during a sport contest as described in various representative embodiments.

If the reflected-infrared signal 225 is to be enhanced remotely in the second signal modification module 160, block 515 transfers control to block 570 of FIG. 5D. Otherwise, block 515 transfers control to block 540 of FIG. 5C.

FIG. 5B is a flow chart of a second part of another method 500 for detecting and enhancing a sport object 105 during a sport contest 110 as described in various representative embodiments. In block 516 of FIG. 5B, the reflected-infrared signal 225 is enhanced in the first signal modification module 155 to create the enhanced-infrared signal 330*b*. Block 516 then transfers control to block 518.

In block 518, the enhanced-infrared signal 330*b* and the visible light signal 145 are recombined as the recombined signal 350 in the first signal modification module 155. Block 518 then transfers control to block 520.

If the user at the video presentation apparatus 170, has the option of whether to display the recombined signal 350 or the visible light signal 145, block 520 transfers control to block 526, otherwise block 520 transfers control to block 522.

In block 522, the recombined signal 350 is transferred to the video presentation apparatus 170 via the transfer apparatus 165. Block 522 then transfers control to block 524.

In block 524, the recombined signal 524 is displayed on the video display 175 as display signal 370. Block 524 then terminates the process for that frame of video information and transfers control back to block 506 in FIG. 5A for an additional frame of video information.

In Block 526, both the visual light signal 145 and the recombined signal 350 are transferred to the second signal modification module 160 via the transfer apparatus 165. Block 526 then transfers control to block 528.

If the user elects to display the recombined signal 350, block 528 transfers control to block 524. Otherwise, block 528 transfers control to block 530.

In block 530, the visible light signal 145 is displayed on the video display 175 as display signal 370. Block 524 then terminates the process for that frame of video information and transfers control back to block 506 in FIG. 5A for an additional frame of video information.

FIG. 5C is a flow chart of a third part of another method 500 for detecting and enhancing a sport object 105 during a sport contest 110 as described in various representative embodiments. In block 540 of FIG. 5C, the reflected-infrared signal 225 is enhanced locally in the first signal modification module 155. Block 540 then transfers control to block 545.

In Block 545, both the visual light signal 145 and the enhanced-infrared 330*b* are transferred to the second signal modification module 160 via the transfer apparatus 165. Block 545 then transfers control to block 550.

If the user has the option of displaying the visible light signal 145 instead of the recombined signal 350 and elects to display the visible light signal 145, block 550 transfers control to block 555. Otherwise, block 550 transfers control to block 560.

In block 555, the visible light signal 145 is displayed on the video display 175 as display signal 370. Block 555 then terminates the process for that frame of video information and transfers control back to block 506 in FIG. 5A for an additional frame of video information.

In block 560, the enhanced-infrared signal 330*b* and the visible light signal 145 are recombined as the recombined signal 350 in the second signal modification module 160. Block 560 then transfers control to block 565.

In block 565, the recombined signal 350 is displayed on the video display 175 as display signal 370. Block 565 then terminates the process for that frame of video information and transfers control back to block 506 in FIG. 5A for an additional frame of video information.

FIG. 5D is a flow chart of a fourth part of another method 500 for detecting and enhancing a sport object 105 during a sport contest 110 as described in various representative embodiments. In block 570 of FIG. 5D, both the visual light signal 145 and the reflected-infrared signal 225 are transferred to the second signal modification module 160 via the transfer apparatus 165. Block 570 then transfers control to block 575.

If the user has the option of displaying the visible light signal 145 instead of the recombined signal 350 and elects to display the visible light signal 145, block 575 transfers control to block 580. Otherwise, block 575 transfers control to block 585.

In block 580, the visible light signal 145 is displayed on the video display 175 as display signal 370. Block 580 then terminates the process for that frame of video information and transfers control back to block 506 in FIG. 5A for an additional frame of video information.

In block 585, the reflected-infrared signal 225 is enhanced remotely in the second signal modification module 160 to create an enhanced infrared signal 330*b*. Block 585 then transfers control to block 590.

In block 590, the enhanced infrared signal 330*b* and the visible light signal 145 are recombined as the recombined signal 350 in the second signal modification module 160. Block 590 then transfers control to block 595.

In block 595, the recombined signal 350 is displayed on the video display 175 as display signal 370. Block 595 then terminates the process for that frame of video information and transfers control back to block 506 in FIG. 5A for an additional frame of video information.

As is the case, in many data-processing products, the systems described above may be implemented as a combination of hardware and software components. Moreover, the functionality required for at least some of the use of the representative embodiments may be embodied in computer-readable media (such as floppy disks, conventional hard disks, DVDs, CD-ROMs, Flash ROMs, nonvolatile ROM, and RAM) to be used in programming an information-processing apparatus to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

In a representative embodiment, a system 100 for video detection and enhancement of a sport object 105 during a sport contest 110 is disclosed. The system 100 comprises the sport object 105 configured to phosphoresce at a selected non-visible frequency, a video collection and separation apparatus 135 configured to detect visible light 140 from a scene 190 that includes the sport object 105 and to detect phosphorescence radiation 130 emitted by the sport object 105 at the selected non-visible frequency, configured to separate the detected visible light 140 from the detected phosphorescence radiation 130, and configured to create a visible light signal 145 from the detected visible light 140 and to create a phosphorescent signal 150 from the detected phosphorescence radiation 130, an enhancement module 320 configured to receive and to enhance the phosphorescent signal 150, and a merge module 340 configured to receive and to recombine the enhanced-phosphorescent signal 330 and the visible light signal 145 into a recombined signal 350.

In another representative embodiment, a system 100 for video detection and enhancement of a sport object 105 during a sport contest 110 is disclosed. The system 100 comprises an illumination apparatus 205 configured to emit infrared radiation 210 at a selected infrared frequency, the sport object 105 configured to reflect the emitted infrared radiation 210 at the selected infrared frequency, a video collection and separation apparatus 135, configured to detect visible light 140 from a scene 190 that includes the sport object 105 and to detect reflected infrared radiation 215 from the sport object 105 at the selected infrared frequency, configured to separate the detected visible light 140 from the detected reflected infrared radiation 215, and configured to create a visible light signal 145 from the detected visible light 140 and to create a reflected-infrared signal 225 from the detected reflected infrared radiation 215, an enhancement module 320 configured to receive and to enhance the reflected-infrared signal 225, and a merge module 340 configured to receive and to recombine the enhanced-infrared signal 330b and the visible light signal 145 into a recombined signal 350.

In still another embodiment, a method 400 for video detection and enhancement of a sport object 105 during a sport contest 110 is disclosed. The method 400 comprises illuminating the sport object 105 with radiation capable of inducing phosphorescent radiation 130 in the sport object 105 during the sport contest 110, detecting visible light 140 from a scene 190 that includes the sport object 105 and detecting phosphorescence radiation 130 emitted by the sport object 105 at a selected non-visible frequency, separating the detected visible light 140 from the detected phosphorescence radiation 130, creating a visible light signal 145 from the detected visible light 140 and creating a phosphorescent signal 150 from the detected phosphorescence radiation 130, enhancing the phosphorescent signal 150, and recombining the enhanced-phosphorescent signal 330 and the visible light signal 145 into a recombined signal 350. The recombined signal 350 is configured for display on a video presentation apparatus 170.

In yet another embodiment, a method 500 for video detection and enhancement of a sport object 105 during a sport contest 110. The method 500 comprises illuminating the sport object 105 with infrared radiation 210 during the sport contest 110, detecting visible light 140 from a scene 190 that includes the sport object 105 and detecting reflected infrared radiation 215 reflected from the sport object 105 at a selected non-visible frequency, separating the detected visible light 140 from the detected reflected infrared radiation 215, creating a visible light signal 145 from the detected visible light 140 and creating a reflected-infrared signal 225 from the detected reflected infrared radiation 215, enhancing the reflected-infrared signal 225, and recombining the enhanced-infrared signal 330b and the visible light signal 145 into a recombined signal 350. The recombined signal 350 is configured for display on a video presentation apparatus 170.

Embodiments disclosed herein provide the capability of displaying enhanced images of various sport objects 105, thereby making the sport object 105 more easily identifiable on a video display 175. In a representative embodiment, the sport object is configured to phosphoresce at a selected non-visible frequency. Visible light from a scene that includes the sport object is detected, as is phosphorescence emitted by the sport object at the selected non-visible frequency. The phosphorescent signal from the sport object is separated from the visible light from the scene, visually enhanced for display, and then recombined with the visual light prior to display. In another representative embodiment, the sport object is configured to reflect infrared radiation at a selected non-visible frequency. Visible light from a scene that includes the sport object is detected, as is infrared radiation reflected by the sport object at the selected non-visible frequency. The reflected infrared radiation signal from the sport object is separated from the visible light from the scene, visually enhanced for display, and then recombined with the visual light prior to display.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system for video detection and enhancement of a sport object during a sport contest, comprising:
   the sport object configured to phosphoresce at a selected non-visible frequency;
   a video collection and separation apparatus, configured to detect visible light from a scene that includes the sport object and to detect phosphorescence radiation emitted by the sport object at the selected non-visible frequency, configured to separate the detected visible light from the detected phosphorescence radiation, and configured to create a visible light signal from the detected visible light and to create a phosphorescent signal from the detected phosphorescence radiation, wherein the visible light signal is separated from the phosphorescent signal by separately detecting the visible light from the scene and the phosphorescence radiation emitted by the sport object;
   an enhancement module configured to receive and to enhance the phosphorescent signal; and
   a merge module configured to receive and to recombine a resulting enhanced-phosphorescent signal and the visible light signal into a recombined signal.

2. The system as recited in claim 1, further comprising:
   a computer having a video screen or a television receiver having a television screen, wherein the merge module is further configured to transfer the recombined signal to the computer or to the television receiver and wherein the computer is configured to display the recombined signal received from the merge module on the video screen or the television receiver is configured to display the recombined signal received from the merge module on the television screen.

3. The system as recited in claim 1, further comprising:
a computer having a video screen or a television receiver having a television screen; and
a transfer apparatus configured to transfer the recombined signal from the merge module to the remotely located computer or to the remotely located television receiver, wherein the computer is configured to display the recombined signal received from the merge module on the video screen or the television receiver is configured to display the recombined signal received from the merge module on the television screen.

4. The system as recited in claim 1, further comprising:
a computer having a video screen or a television receiver having a television screen; and
a transfer apparatus configured to transfer the enhanced-phosphorescent signal and the visible light signal to the merge module, wherein the merge module is remotely located with the computer or is remotely located with the television receiver, wherein the merge module is further configured to transfer the recombined signal to the computer or to the television receiver, and wherein the computer is configured to display the recombined signal received from the merge module on the video screen or the television receiver is configured to display the recombined signal received from the merge module on the television screen.

5. The system as recited in claim 1, further comprising:
a computer having a video screen or a television receiver having a television screen; and
a transfer apparatus configured to transfer the phosphorescent signal to the enhancement module and the visible light signal to the merge module, wherein the enhancement module and the merge module are remotely located with the computer or are remotely located with the television receiver, wherein the merge module is further configured to transfer the recombined signal to the computer or to the television receiver, and wherein the computer is configured to display the recombined signal received from the merge module on the video screen or the television receiver is configured to display the recombined signal received from the merge module on the television screen.

6. The system as recited in claim 1, further comprising:
a transfer apparatus, wherein the transfer apparatus is configured to transfer via the Internet the recombined signal to a remotely located computer having a video screen or to a remotely located television receiver having a television screen, wherein the transfer apparatus is configured to transfer via the Internet the enhanced-phosphorescent signal and the visible light signal to the merge module with the merge module remotely located with the computer or remotely located with the television receiver, or wherein the transfer apparatus is configured to transfer via the Internet the enhanced-phosphorescent signal to the enhancement module and the visible light signal to the merge module with the enhancement module and the merge module remotely located with the computer or remotely located with the television receiver.

7. The system as recited in claim 1, wherein the enhancement module is configured to brighten, color, pattern, or place a halo around the image of the sport object in the phosphorescent signal.

8. The system as recited in claim 1, wherein the video collection and separation apparatus comprises multiple video cameras placed so as to provide differing views of the sport contest.

9. The system as recited in claim 1, further comprising:
a switch module configured to enable a user to display either the recombined signal or the visible light signal without enhancement of the sport object.

10. A system for video detection and enhancement of a sport object during a sport contest, comprising:
an illumination apparatus configured to emit infrared radiation at a selected infrared frequency;
the sport object configured to reflect the emitted infrared radiation at the selected infrared frequency;
a video collection and separation apparatus, configured to detect visible light from a scene that includes the sport object and to detect reflected infrared radiation from the sport object at the selected infrared frequency, configured to separate the detected visible light from the detected reflected infrared radiation, and configured to create a visible light signal from the detected visible light and to create a reflected-infrared signal from the detected reflected infrared radiation, wherein the visible light signal is separated from the reflected-infrared signal by separately detecting the visible light from the scene and the reflected infrared radiation emitted by the sport object;
an enhancement module configured to receive and to enhance the reflected-infrared signal; and
a merge module configured to receive and to recombine a resulting enhanced-infrared signal and the visible light signal into a recombined signal.

11. The system as recited in claim 10, further comprising:
a computer having a video screen or a television receiver having a television screen, wherein the merge module is further configured to transfer the recombined signal to the computer or to the television receiver and wherein the computer is configured to display the recombined signal received from the merge module on the video screen or the television receiver is configured to display the recombined signal received from the merge module on the television screen.

12. The system as recited in claim 10, further comprising:
a computer having a video screen or a television receiver having a television screen; and
a transfer apparatus configured to transfer the recombined signal from the merge module to the remotely located computer or to the remotely television receiver, wherein the computer is configured to display the recombined signal received from the merge module on the video screen or the television receiver is configured to display the recombined signal received from the merge module on the television screen.

13. The system as recited in claim 10, further comprising:
a computer having a video screen or a television receiver having a television screen; and
a transfer apparatus configured to transfer the enhanced-infrared signal and the visible light signal to the merge module, wherein the merge module is remotely located with the computer or is remotely located with the television receiver, wherein the merge module is further configured to transfer the recombined signal to the computer or to the television receiver, and wherein the computer is configured to display the recombined signal received from the merge module on the video screen or the television receiver is configured to display the recombined signal received from the merge module on the television screen.

14. The system as recited in claim 10, further comprising:
a computer having a video screen or a television receiver having a television screen; and
a transfer apparatus configured to transfer the reflected-infrared signal to the enhancement module and the visible light signal to the merge module, wherein the enhancement module and the merge module are remotely located with the computer or are remotely located with the television receiver, wherein the merge module is further configured to transfer the recombined signal to the computer or to the television receiver, and wherein the computer is configured to display the recombined signal received from the merge module on the video screen or the television receiver is configured to display the recombined signal received from the merge module on the television screen.

15. The system as recited in claim 10, further comprising:
a transfer apparatus, wherein the transfer apparatus is configured to transfer via the Internet the recombined signal to a remotely located computer having a video screen or to a remotely located television receiver having a television screen, wherein the transfer apparatus is configured to transfer via the Internet the enhanced-infrared signal and the visible light signal to the merge module with the merge module remotely located with the computer or remotely located with the television receiver, or wherein the transfer apparatus is configured to transfer via the Internet the reflected-infrared signal to the enhancement module and the visible light signal to the merge module with the enhancement module and the merge module remotely located with the computer or remotely located with the television receiver.

16. The system as recited in claim 10, wherein the enhancement module is configured to brighten, color, pattern, or place a halo around the image of the sport object in the reflected-infrared signal.

17. The system as recited in claim 10, wherein the video collection and separation apparatus comprises multiple video cameras placed so as to provide differing views of the sport contest.

18. The system as recited in claim 10, wherein the infrared radiation emitted by the illumination apparatus is modulated.

19. The system as recited in claim 10, further comprising:
a switch module configured to enable a user to display either the recombined signal or the visible light signal without enhancement of the sport object.

20. A method for video detection and enhancement of a sport object during a sport contest, comprising:
illuminating the sport object with radiation capable of inducing phosphorescent radiation in the sport object during the sport contest;
detecting visible light from a scene that includes the sport object and detecting the phosphorescence radiation emitted by the sport object at a selected non-visible frequency;
separating the detected visible light from the detected phosphorescence radiation, wherein the visible light signal is separated from the reflected-infrared signal by separately detecting the visible light from the scene and the reflected infrared radiation emitted by the sport object;
creating a visible light signal from the detected visible light and creating a phosphorescent signal from the detected phosphorescence radiation;
enhancing the phosphorescent signal; and
recombining a resulting enhanced-phosphorescent signal and the visible light signal into a recombined signal, wherein the recombined signal is configured for display on a video presentation apparatus.

21. A method for video detection and enhancement of a sport object during a sport contest, comprising:
illuminating the sport object with infrared radiation during the sport contest;
detecting visible light from a scene that includes the sport object and detecting reflected infrared radiation reflected from the sport object at a selected non-visible frequency;
separating the detected visible light from the detected reflected infrared radiation, wherein the visible light signal is separated from the reflected-infrared signal by separately detecting the visible light from the scene and the reflected infrared radiation emitted by the sport object;
creating a visible light signal from the detected visible light and creating a reflected-infrared signal from the detected reflected infrared radiation;
enhancing the reflected-infrared signal; and
recombining a resulting enhanced-infrared signal and the visible light signal into a recombined signal, wherein the recombined signal is configured for display on a video presentation apparatus.

* * * * *